July 9, 1940.    J. E. BAKER    2,207,689
GAS PLANT
Filed July 23, 1937
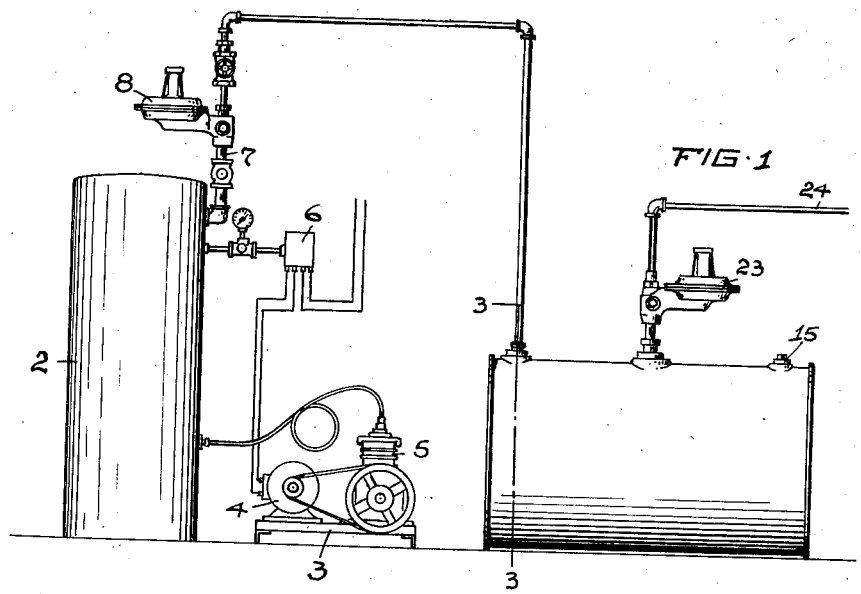
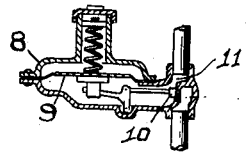
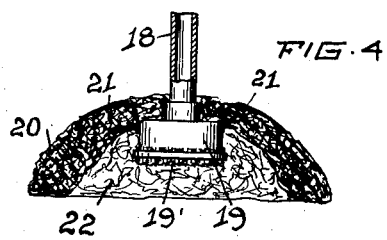
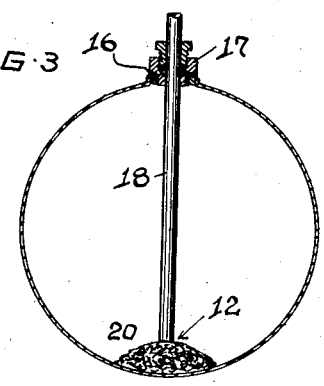
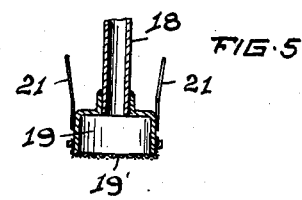
J. E. BAKER
INVENTOR
BY Gustav A. Wolff
ATTORNEY Patented July 9, 1940

2,207,689

UNITED STATES PATENT OFFICE 2,207,689

GAS PLANT

J. E. Baker, Cleveland, Ohio

Application July 23, 1937, Serial No. 155,295

3 Claims. (Cl. 261—122)

This invention relates to gas plants of the air and liquid contact type in which air under pressure is forced into a tank for vaporizable fuel to effect mixture of the air and fuel to form a gas which can be used for cooking, heating, lighting and other purposes.

The general object of the present invention is the provision of a gas plant of the type referred to with carbureting means adapted to convert a column of air forced into the fuel into a dispersion of air bubbles of sufficient minuteness so that the bubbles will rise to the surface of the fuel and intimately contact and mix with the fuel and become properly saturated therewith to form a combustible mixture which can then be stored as in the fuel tank above the surface of the liquid fuel.

Another object of the present invention is the provision of a gas plant of the type referred to with a carbureting device having means for discharging a plurality of fine air streams into liquid fuel in a fuel tank close to the bottom thereof, and means for breaking up the streams into minute disconnected parts and charging the parts with such fuel while ascending therein.

The present invention includes the provision of a gas plant of the type referred to with an effective carbureting device of simple construction embodying, as a primary air-dividing means, a finely screened outlet and, as a secondary means, a cup-shaped, air-comminuting and intercepting member preferably of intermixed and interwoven fine metal shavings, which intercepting member encircles the outlet and which may rest upon the bottom of the fuel tank, so as to insure interception and further division and dispersal over a wide area of all air forced into the tank through the outlet.

Other objects and novel features of the invention will become apparent from the following description which relates to the accompanying drawing showing a preferred form.

In the drawing, Fig. 1 is a side view of a gas plant embodying the carbureting device according to the invention; Fig. 2 is a cross sectional view through one of two pressure regulators used in the plant shown in Fig. 1. Fig. 3 is a vertical sectional view through the fuel tank of the gas plant shown in Fig. 1, the carbureting device being shown in elevation and the section being taken on line 3—3 of Fig. 1. Fig. 4 is an enlarged sectional view through the carbureting device. Fig. 5 is an enlarged sectional view through the outlet box of the carbureting device and Fig. 6 an enlarged sectional view through the intercepting and air dispersing element of the carbureting device.

Referring in detail to the exemplary form of the gas plant shown, 2 is an air storage tank into which a supply of air under pressure is maintained by means of a compressor unit 3 embodying an electric motor 4 and a compressor 5. A pressure actuated switch 6, diagrammatically shown, interrupts the motor circuit when the desired pressure has been attained in the air storage tank 2.

Air under pressure is led from the tank 2 through a valve controlled pipe line 7 to and through a pressure regulator 8, shown in cross section in Fig. 2, and embodying a pressure actuated diaphragm 9, which supports a shiftable valve member 10 controlling the outlet 11 of the pressure regulator, to a carbureting device 12 in a fuel tank 14, having a filling opening 15.

The carbureting device 12 is inside the fuel tank 14 and connected to a vertical pipe 18 which is received through a relatively small inlet opening 16 in the tank wall and sealed thereto by means of a fitting 17. At the lower end of the pipe is a substantially cylindrical outlet box 19, the open lower end of which is covered by a fine mesh wire screen 19'. This wire screen breaks up air forced through pipe 18 into a plurality of fine air streams which intimately mix with the liquid fuel around outlet box 19 and carry fuel particles therewith. The air admitted through the screen is further broken up into minute bubbles by an inverted cup-shaped or concavo-convex flexible shell member 20 which is preferably hemi-spherical in shape. This member is reticulate, preferably being made of intermixed and interwoven thin and narrow metal shavings of brass or copper, and of sufficient thickness to provide a multiplicity of small tortuous passages and sharp cutting edges, has a central aperture which snugly receives the pipe 18 and can be secured to the outlet box 19 by means of tie wires 21. The wires can be fastened to the box 19, so as properly to position the member 20 around the box 19. The rim of the member 20 preferably rests against the wall of the fuel tank 14 a considerable distance outwardly from the outlet and preferably below said outlet, as shown, to insure passing of all the air and fuel mixture through the member 20 and over a wide area horizontally.

The air streams forced from the box 19 and which become intimately intermixed with the liquid fuel, spread and then rise in the chamber 22, and finally pass from said chamber through the tortuous passages of the member 20, being finally discharged as much smaller bubbles into the liquid body outside of the member 20.

Member 20, as previously described, preferably is made from thin, narrow metal shavings with rough generally serrated edges, and effects complete breaking up of the air streams into minute bubbles. These bubbles, because of being discharged over a wide area by the member 20 do not tend to coalesce, and due to their extremely small size rise slowly, and in so doing absorb sufficient fuel, so that upon separation from the liquid body in tank 14, a thoroughly saturated, combustible air-fuel mixture displaces or mixes with the air originally in the upper part of the tank, and is ready to be used in any suitable burner. The inner resistance of the carbureting device is low and permits of proper carbureting of the air at approximately one lb. per square inch.

The efficiency of the device is entirely controlled by the wire-mesh of screen 19', the material of the member 20 and the size of the chamber 22. The fact that the member 20 is made of pliable material, which can easily be bent and shaped, permits the carbureting device to be readily inserted through an inlet opening 16 of small dimensions, two to three inches diameter having been found sufficient. Fastening of the member 20 to the outlet box 19 can be accomplished after said member has been entered into the tank and has been bent into inverted cup-shaped form. It naturally tends to assume and maintain said form.

The pressure of the air-fuel mixture in the gas line 24 should be independent of the pressure in the mixing chamber and should not be influenced by fluctuations of the liquid fuel level in fuel tank 14, wherefore I provide a secondary pressure regulator 23 which can be set to reduce the pressure in the gas line 24 to approximately 5 ounces per square inch.

Having thus described my invention, I claim:

1. In a gas plant having a liquid fuel tank and means for introducing air into the tank under pressure, a carbureting device arranged within said tank, said carbureting device comprising a pipe extended generally downwardly into the tank for conducting such air, and having an outlet opening below the level of liquid in the tank, all other portions of the pipe within the tank being imperforate, and an air intercepting member in peripherally closed relation to the pipe and extending outwardly substantial distances laterally from the outlet on all sides and downwardly below the outlet opening and in the form of a downwardly opening, concavo-convex shell, said member having a relatively thick but readily permeable wall capable of maintaining a predetermined shape and with a multiplicity of sharp cutting edges variously disposed and of tortuous passages therethrough of such size that air from the outlet is broken up and discharged into the liquid above the member in the form of isolated bubbles of sufficient minuteness so that the bubbles will rise slowly through the fuel and become charged therewith.

2. In a gas plant, a tank for liquid fuel having an opening in one of its walls, an air supply pipe extending into the tank through the opening and with its inner end adjacent a bottom wall of the tank, a sleeve for securing the pipe in the opening and effecting a seal about the pipe, and a pliable device surrounding the pipe and in the form of a concavo-convex shell which is open downwardly and has its open side below the level of the inner end of the pipe and having a wall formed of strands heterogeneously arranged and having a multiplicity of sharp cutting edges and comparatively open tortuous passages therethrough, said device being insertable in collapsed condition through said opening when the sleeve is removed and capable of then being spread out and of sustaining itself in its concavo-convex shape within the tank, so that it can operate as an air interceptor and separator in the manner described for a material distance laterally from the pipe on all sides.

3. In a gas plant a liquid fuel tank and a carbureting device within said tank, said carbureting device comprising an air supply pipe extended through a wall of said tank and having a terminal portion extending downwardly below the level of liquid in the tank, an enlarged outlet device at the lower end portion of said pipe having a screen thereacross, and an air separating member of metal wool having relatively thin sharp edged strands, said member being substantially in the form of a hemi-spherical shell and being of sufficient thickness so that it will retain its form and extend a considerable distance laterally from the outlet device all around the latter, thereby providing a readily permeable interceptor and separator for air bubbles discharged through the screen.

J E. BAKER.